United States Patent
Matsumoto et al.

(10) Patent No.: US 7,659,729 B2
(45) Date of Patent: Feb. 9, 2010

(54) METHOD AND DEVICE FOR MEASURING WIDTH DIRECTION END POSITION OF STRIPE BODY, AND METHOD AND DEVICE FOR MEASURING WIDTH DIRECTION CENTER POSITION OF STRIPE BODY

(75) Inventors: Koichi Matsumoto, Hachioji (JP); Takeo Yamada, Kanagawa (JP)

(73) Assignee: Nireco Corporation, Tokyo (JP)

(*) Notice: Subject to any disclaimer, the term of this patent is extended or adjusted under 35 U.S.C. 154(b) by 343 days.

(21) Appl. No.: 11/666,113

(22) PCT Filed: Sep. 12, 2005

(86) PCT No.: PCT/JP2005/017202
§ 371 (c)(1),
(2), (4) Date: Apr. 24, 2007

(87) PCT Pub. No.: WO2006/048979
PCT Pub. Date: May 11, 2006

(65) Prior Publication Data
US 2008/0094073 A1    Apr. 24, 2008

(30) Foreign Application Priority Data
Nov. 8, 2004    (JP) .................... 2004-323797

(51) Int. Cl.
*G01R 27/32* (2006.01)
(52) U.S. Cl. .................... 324/644; 324/637; 324/642
(58) Field of Classification Search ............. 324/637, 324/642, 644
See application file for complete search history.

(56) References Cited

U.S. PATENT DOCUMENTS

| 5,075,863 A | 12/1991 | Nagamune et al. |
| 6,609,451 B1* | 8/2003 | Inoue et al. .................. 324/329 |
| 6,679,153 B2* | 1/2004 | Inoue et al. .................. 324/329 |
| 7,428,468 B2* | 9/2008 | Takemura et al. ........... 702/159 |

FOREIGN PATENT DOCUMENTS

| CN | 1041654 A | 4/1990 |
| JP | 47-25784 Y | 8/1972 |
| JP | 61-014509 A | 1/1986 |
| JP | 61-14509 A | 1/1986 |
| JP | 63-100331 A | 5/1988 |
| JP | 02-145985 A | 6/1990 |
| JP | 06-123781 A | 5/1994 |
| JP | 07-181002 A | 7/1995 |

OTHER PUBLICATIONS

M. M. Millen et al., "Plant tests of an on-line multiple-pipe pulverised coal mass flow measuring system." Flow Measurement and Instrumentation 11 (2000) 153-158.
Zhang, G. Q i-liang, et al., "Development and Operation of the Bright Annealing Furnace for Cold-rolling Thin Stainless Steel Tapes in Small and Medium Scale." 1002-1639 (2001) 03-0049-03.
Cheng Xing-de, et al "A Review and Prospect for Development of cold Rolled Steel Sheet ATPZH Steel." Iron Steel Vanadium Titanium, vol. 22, No. 2, Jun. 2001.
Chinese Office Action dated May 9, 2008 and English translation thereof issued in a counterpart Chinese Application No. 200580037459.8.
Chinese Office Action dated Jan. 9, 2009 and English translation thereof issued in a counterpart Chinese Application No. 200580037459.8.
Chinese Office Action dated May 8, 2009 and English translation thereof issued in a counterpart Chinese Application No. 200580037459.8.

* cited by examiner

*Primary Examiner*—Timothy J Dole
(74) *Attorney, Agent, or Firm*—Frishauf, Holtz, Goodman & Chick, P.C.

(57) ABSTRACT

A microwave sending antenna 3R and a microwave receiving antenna 4R are provided to a right-side furnace wall 1R, and the system is devised so that the microwaves emitted from the microwave sending antenna 3R are reflected by the right-side edge of a cold-rolled steel plate 2, and the reflected waves are received by the microwave receiving antenna 4R. Similarly, a microwave sending antenna 3L and a microwave receiving antenna 4L are provided to a left-side furnace wall 1L, and the system is devised so that the microwaves emitted from the microwave sending antenna 3L are reflected by the left-side edge of the cold-rolled steel plate 2, and the reflected waves are received by the microwave receiving antenna 4L. If the time from the sending of the microwaves until the receiving of the reflected waves is designated as t, and the velocity of the microwaves is designated as c, then the distance to the object reflecting the microwaves is determined from $t \cdot c/2$. It is possible to provide a method for measuring the width-direction end position of a material strip with which noise and atmosphere have little effect, installation is easy, and there is little mechanical interference with the material strip.

10 Claims, 3 Drawing Sheets

METHOD AND DEVICE FOR MEASURING WIDTH DIRECTION END POSITION OF STRIPE BODY, AND METHOD AND DEVICE FOR MEASURING WIDTH DIRECTION CENTER POSITION OF STRIPE BODY

This application is a U.S. National Phase Application under 35 USC 371 of International Application PCT/JP2005/017202 filed Sep. 12, 2005.

TECHNICAL FIELD

The present invention relates to a method and apparatus for measuring the width-direction end position of a moving strip of material such as steel sheeting, and to a method and apparatus for measuring the center position.

BACKGROUND ART

The need arises in the production lines and processing lines of metals such as steel and copper sheeting to maintain a strip of moving steel sheeting, copper sheeting, or the like in a specific center position and edge position. For instance, in a furnace for continuously annealing steel sheeting, it is necessary to control the center position of the moving steel sheet so as to substantially match the center position of the heat treatment furnace so that the moving steel sheet will not be damaged or broken as a result of this sheet meandering and hitting the furnace wall. Furthermore, in cases where steel or copper sheeting is wound in a coil, in order to prevent the edges of the coil from becoming uneven, the sheeting must be wound in a controlled fashion so that the edge positions of the steel or copper sheeting will be in specific positions with respect to the winding apparatus. A control apparatus called CPC (Center Position Control) or EPC (Edge Position Control) is used to achieve such control.

In CPC, generally the center position of a strip is sensed by a center position sensor, and feedback control is performed by varying the inclination of a roll called a steering roll, so that the center position of the strip remains constant. In EPC, generally the edge position of a metal strip is sensed by a strip end position sensor, and the position of the winding apparatus is moved, so that the relative positional relationship between the strip edge position and the winding apparatus is kept constant.

Optical, pneumatic, electrostatic capacitive, and electromagnetic inductive types have been used as the center position sensors and end position sensors used in such CPC and EPC. These are sensors that basically sense the edge position of a strip or the like, and if the edge positions on both sides are sensed, the center position can be ascertained as the center point between the two edge positions.

With an optical sensor, a light projector and a light receiver are disposed across from each other with a metal strip in between, and the edge position of the metal strip is sensed by measuring with the light receiver the proportion of the light from the light projector blocked by the metal strip. Another kind of optical sensor features a sensor that makes use of a camera. In cases where a camera is used to detect the position of a strip end, there is a configuration in which a light projector that emits light is disposed on the opposite side from the camera, i.e., on the opposite side with the metal strip in between, and a configuration in which a light projector is disposed on the same side as the camera, the light is shined on the metal strip, and the position of the metal strip end is determined from the reflected light.

With a pneumatic sensor, an air blower and an air pressure sensor are disposed across from each other with a metal strip in between, the air that is blown is blocked by the material being sensed, and the edge position of the metal strip is detected by utilizing the fact that the pressure sensed by the air pressure sensor varies according to the edge position of the metal strip.

With an electrostatic capacitive sensor, a metal strip is passed between two parallel plate electrodes, and the edge position of the metal strip is detected by utilizing the fact that the electrostatic capacity between the electrodes varies according to the edge position of the metal strip. With another type of sensor, an AC signal is applied between electrode plates disposed with a metal strip in between, and an electric field is generated between the electrode plates. The metal strip is generally grounded, and the strength of the electric field that is received varies according to the position of the metal strip because of an electrostatic blocking effect.

With an electromagnetic inductive sensor, generally a sending coil and a receiving coil are installed with a metal strip in between, and the edge position of the metal strip is detected by utilizing the principle that the magnetic field generated from the sending coil is attenuated by the effect of the eddy current generated on the metal strip.

Such a method and apparatus for measuring the position of a metal strip are described in Japanese Patent 2571330 (Patent Reference 1), for example.

Of these types of sensor, a problem with an optical sensor is that it is susceptible to the effects of steam, dust, and so forth, and can only be used in places where the environment conditions are relatively favorable. Furthermore, a fluorescent lamp is used as the projector because it is low in cost and easy to handle, but it has a short service life and has to be replaced periodically. In cases where a camera is used, there are also problems with soiling and the service life of the fluorescent lamp, making it difficult to use such a sensor for extended periods without maintenance.

With a pneumatic sensor, a constant air flow is required, so that there is a problem in terms of energy consumption, and another problem is poor detection precision. Therefore, such sensors are rarely used except in places where explosion-proof performance is required.

An electrostatic capacitive sensor needs to detect an extremely slight change in electrostatic capacity, on the order of a few picofarads. However, a change in the electrostatic capacity as small as this can be produced as a result of a change in the temperature of a coaxial cable or of the approach of a person to the electrodes, so that it is difficult to make a stable measurement.

With all types other than an optical sensor (camera type), the edge position is detected from the amount of attenuation of a signal caused by insertion of a metal strip between a sender and a receiver, and the amount of signal received is measured as an analog quantity. Inside a furnace such as a continuous annealing furnace, the condition of a sensor cannot be checked visually, so that the condition of the object being measured must be evaluated only from the analog signal that is output from the sensor. Accordingly, in the event of some kind of malfunction, that is, if the signal that is output from the sensor should exhibit abnormal behavior, a problem is that the cause cannot be ascertained from the analog signal alone, and it takes time to rectify this situation.

Moreover, with all these types of sensor, a metal strip has to be sandwiched in between, or the apparatus has to be installed to one side of the metal strip. Therefore, it is difficult to provide the sensor inside a heating furnace such as a continuous annealing furnace, and large-scale cooling (such as water cooling) is required. Furthermore, another problem is that the apparatus can be damaged due to damage to the metal strip or the like.

DISCLOSURE OF THE INVENTION

The present invention was devised in light of such circumstances; it is an object of the present invention to provide a method and apparatus for measuring the width-direction end position of a strip of material, and a method and apparatus for measuring the width-direction center position of a strip of material, with which noise and atmosphere have little effect, installation is easy, and there is little mechanical interference with the material strip.

The first means for solving the problems described above is a method for measuring the width-direction end position of a moving strip of material, wherein the width-direction end of the material strip is irradiated with electromagnetic waves from an antenna, the electromagnetic waves reflected by the width-direction end of the material strip are received by the antenna, and the position of the width-direction end of the material strip is measured on the basis of the time difference between the point when the electromagnetic waves were emitted and the point when the reflected electromagnetic waves were detected.

In the past, it was universally known that if an object that reflects electromagnetic waves was irradiated with electromagnetic waves and the reflected waves were received, then the distance to this object was measured from the return time of the electromagnetic waves and the propagation rate of the electromagnetic waves. However, although this method was used to measure the distance to the surface of a strip of material, it was not used to measure the distance to the edge of a strip of material. This is because the thickness of such material strips is small (usually only approximately 0.1 mm to 3 mm), and it was believed that the reflected electromagnetic waves were not strong enough, and measurement would be difficult.

Surprisingly, however, experiments conducted by the inventors have revealed that reflected waves strong enough for measurement are indeed obtained even in cases where electromagnetic waves are directed at the end of such a thin material strip (i.e., substantially parallel to the plane of the material strip). The reason for this seems to be that the emitted electromagnetic waves include an electromagnetic wave component having a plane of polarization with a high reflectivity with respect to the direction of length of the material strip, and the edge of the material strip has a sufficient size (length) with respect to this electromagnetic wave component.

In the present means, position measurement is performed according not to the size of a received signal, but to the time of the received signal. Therefore, unlike one of the prior art methods discussed above, this means has the following characteristic feature: namely, even if the level of the received signal should fluctuate due to the effect of noise or the environment, this will not affect the measured value as long as this signal is a specified level or higher.

Furthermore, since an antenna can be placed at a position away from the material strip in its edge direction, the apparatus does not have to be attached in the direction perpendicular to the plane of the material strip. Therefore, the apparatus will not be soiled by any oil or the like that may be adhering to the material strip.

Moreover, even in cases where the material strip is to pass through a furnace, the antenna only needs to be installed on the furnace wall, and no apparatus whatsoever has to be installed inside the furnace. Therefore, the equipment will not be damaged even if the material strip should break.

In any case, there is little possibility of scratching the material strip, and the system is nearly maintenance-free.

The term "antenna" as used in this Specification and in the Claims encompasses both a type in which the sending antenna and receiving antenna are the same, and a type in which these are separate, and these separate antennas shall be collectively referred to as "antenna."

The second means for solving the problems described above is a method for measuring the width-direction center position of a moving strip of material, wherein a first width-direction end of this material strip is irradiated with electromagnetic waves from a first antenna, the electromagnetic waves reflected by the first width-direction end are received by the first antenna, the position of the first width-direction end of the material strip is determined on the basis of the time difference between the point when the electromagnetic waves were emitted and the point when the reflected electromagnetic waves were detected, a second width-direction end of the material strip is irradiated with electromagnetic waves from a second antenna, the electromagnetic waves reflected by the second width-direction end are received by the second antenna, the position of the second width-direction end of the material strip is determined on the basis of the time difference between the point when the electromagnetic waves were emitted and the point when the reflected electromagnetic waves were detected, and the width-direction center position of the material strip is measured from the position of the first width-direction end and the position of the second width-direction end.

With this means, both end positions of the material strip are measured by the first means, and the center position of the material strip is determined from this result. Accordingly, an operational effect similar to that of the first means is manifested.

In addition, in cases where this means is used to determine the width-direction center position of a material strip moving through a heating furnace such as a continuous annealing furnace, since reflected waves will also be obtained from the opposite furnace walls, changes in furnace width can also be measured at the same time. In these heating furnaces, as the temperature rises, the heating furnace itself swells, and the center position of the furnace changes. However, since the distance between furnace walls can be measured at the same time, the center position of the furnace can be ascertained simultaneously with the position of the material strip, so that in controlling the position of the material strip, it is possible to accurately match the center position of the material strip to the actual center position of the furnace.

The third means for solving the problems described above is the second means, wherein the first antenna and second antenna are disposed across from each other, and the electromagnetic waves emitted from at least one antenna are received by the other antenna.

With this means, since the electromagnetic waves emitted from the opposing antennas can be received, it is possible to monitor whether the electromagnetic waves are being sent and received properly. Accordingly, the occurrence of an abnormality can be detected immediately, and a major accident can be avoided by shutting down the line or issuing an alarm.

The fourth means for solving the problems described above is the third means, wherein the distance between the opposing antennas is also determined from the propagation time of the electromagnetic waves emitted by an antenna and received by the opposite antenna.

This means is particularly effective when the center position of a metal sheet is to be detected in a continuous annealing furnace or the like. In these heating furnaces, as the temperature rises, the heating furnace itself swells, and the center position of the furnace changes. With this means, since the distance between the furnace walls can be measured at the same time by installing antennas on the furnace walls, the center position of the furnace can be ascertained simultaneously with the position of the material strip, so that in controlling the position of the material strip, it is possible to accurately match the center position of the material strip to the actual center position of the furnace.

The fifth means for solving the problems described above is any of the second through fifth means, wherein antennas that each have a function of gas purging an electromagnetic wave emission face are used as the first antenna and second antenna.

If metal or other dust should cling to the electromagnetic wave emission face of the antenna, it will weaken the electromagnetic waves that are emitted. With this means, the electromagnetic wave emission face is gas purged to prevent this from happening. Gas purging of the antenna can be accomplished with ease.

The sixth means for solving the problems described above is an apparatus for measuring the width-direction end position of a moving strip of material, comprising: an antenna that emits electromagnetic waves toward the width-direction end of this material strip and receives the electromagnetic waves reflected by the width-direction end; a means for determining the time difference between the point when the electromagnetic waves were emitted and the point when the reflected electromagnetic waves were detected; and a means for determining the position of the width-direction end of the material strip on the basis of the time difference thus determined.

The seventh means for solving the problems described above is an apparatus for measuring the width-direction center position of a moving strip of material, comprising: a first antenna that emits electromagnetic waves toward a first width-direction end of this material strip and receives the electromagnetic waves reflected by the first width-direction end; a means for measuring the time difference between the point when the electromagnetic waves were emitted and the point when the reflected electromagnetic waves were detected; a means for determining the position of the first width-direction end of the material strip on the basis of the measured time difference; a second antenna that emits electromagnetic waves toward a second width-direction end of the material strip and receives the electromagnetic waves reflected by the second width-direction end; a means for measuring the time difference between the point when the electromagnetic waves were emitted and the point when the reflected electromagnetic waves were detected; a means for determining the position of the second width-direction end of the material strip on the basis of the measured time difference; and a means for detecting the width-direction center position of the material strip from the position of the first width-direction end and the position of the second width-direction end.

The eighth means for solving the problems described above is the seventh means, wherein the first antenna and second antenna are disposed across from each other, and the electromagnetic waves emitted from at least one antenna are received by the other antenna.

The ninth means for solving the problems described above is the eighth means, comprising: a means for determining the propagation time of the electromagnetic waves emitted by an antenna and received by the opposite antenna; and a means for determining the distance between the opposing antennas from the propagation time thus determined.

The tenth means for solving the problems described above is any of the seventh through ninth means, wherein the first antenna and second antenna each have a function of gas purging an electromagnetic wave emission face.

BEST MODE FOR CARRYING OUT THE INVENTION

Figure 1:
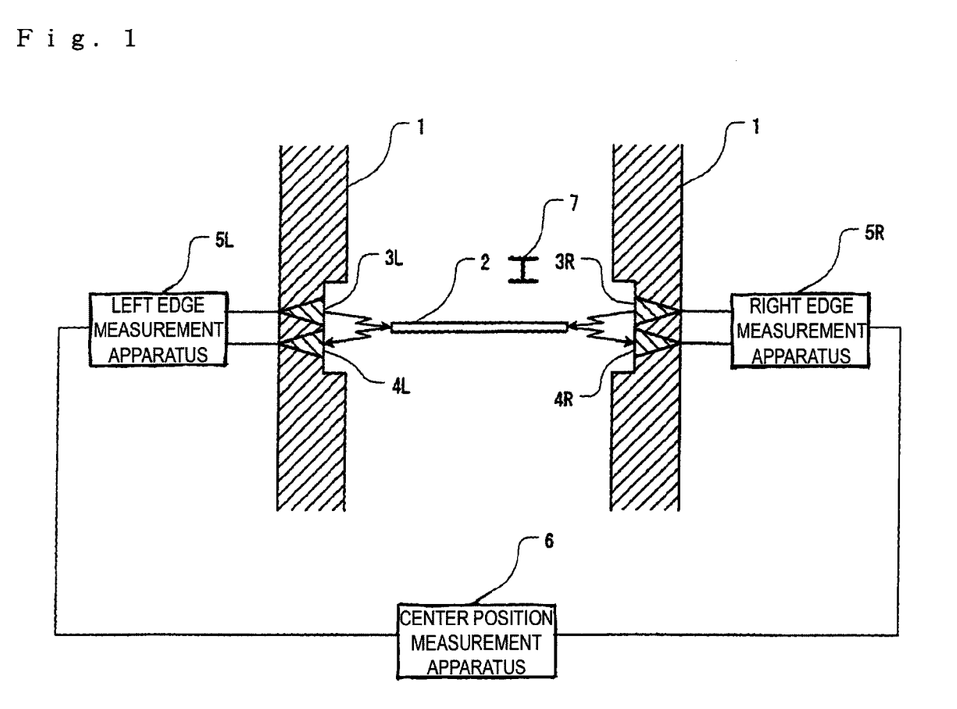
FIG. 1 is a schematic diagram illustrating the basic concept behind an apparatus for measuring the width-direction center position of a steel sheet in a continuous annealing furnace, which is one working configuration of the present invention.

A working configuration of the present invention will be described below using the figures. FIG. 1 is a schematic diagram illustrating the basic concept behind an apparatus for measuring the width-direction center position of a steel sheet in a continuous annealing furnace, which is one working configuration of the present invention. A cold-rolled steel sheet 2 passes between the walls 1R and 1L of a continuous annealing furnace. The left and right directions in the figure indicate the width direction of the cold-rolled steel sheet 2, and the cold-rolled steel sheet 2 is moving from the front to the back as seen from the plane of page.

A microwave sending antenna 3R and a microwave receiving antenna 4R are provided to the right-side furnace wall 1R, and the system is devised so that microwaves emitted from the microwave sending antenna 3R are reflected by the right-side edge of the cold-rolled steel sheet 2, and the reflected waves are received by the microwave receiving antenna 4R. Similarly, a microwave sending antenna 3L and a microwave receiving antenna 4L are provided to the left-side furnace wall 1L, and the system is devised so that microwaves emitted from the microwave sending antenna 3L are reflected by the left-side edge of the cold-rolled steel sheet 2, and the reflected waves are received by the microwave receiving antenna 4L.

If the time from the sending of the microwaves until the receiving of the reflected waves is designated as t, and the velocity of the microwaves is designated as c, then the distance to the object reflecting the microwaves is determined from $t \cdot c/2$.

The microwave sending antenna 3R and the microwave receiving antenna 4R are connected to a right-side edge position measurement apparatus 5R. The right-side edge position measurement apparatus 5R forms microwaves, transfers these microwaves to the microwave sending antenna 3R, converts the microwaves received by the microwave receiving antenna 4R into an electrical signal, processes this electrical signal so as to measure the time t from the sending of the microwaves until the receiving of the reflected waves, calculates from this the distance to the right edge of the cold-rolled steel sheet 2, and measures the right edge position of the cold-rolled steel sheet 2. Similarly, the microwave sending antenna 3L and the microwave receiving antenna 4L are connected to a left-side edge position measurement apparatus 5L. The left-side edge position measurement apparatus 5L forms microwaves, transfers these microwaves to the microwave sending antenna 3L, converts the microwaves received by the microwave receiving antenna 4L into an electrical signal, processes this electrical signal so as to measure the time t from the sending of the microwaves until the receiving of the reflected waves, calculates from this the distance to the left edge of the cold-rolled steel sheet 2, and measures the left edge position of the cold-rolled steel sheet 2. The signals from the right-side edge position measurement apparatus 5R and left-side edge position measurement apparatus 5L are connected to a cold-rolled steel sheet center position measurement apparatus 6, and the cold-rolled steel sheet center position measurement apparatus 6 detects the width-direction center position of the cold-rolled steel sheet 2 as the center point between the right edge position and left edge position.

Furthermore, the microwave sending antenna 3R and microwave receiving antenna 4R are preferably installed at positions as close to the right edge of the cold-rolled steel sheet 2 as possible, and the microwave sending antenna 3L and microwave receiving antenna 4L are preferably installed at positions as close to the left edge of the cold-rolled steel sheet 2 as possible. If this is done, then even in cases where there is a structure 7 at a position farther away than the edge of the cold-rolled steel sheet 2, for example, and reflected waves are received from this structure, the effect of noise from the structure 7 can be avoided by making use of the reflected waves first detected.

Moreover, it is preferable for the antenna pair consisting of the microwave sending antenna 3R and microwave receiving antenna 4R and the antenna pair consisting of the microwave sending antenna 3L and microwave receiving antenna 4L to be disposed across from each other. If this is done, the microwaves emitted from the microwave sending antenna 3R can be received by the microwave receiving antenna 4L, and the microwaves emitted from the microwave sending antenna 3L can be received by the microwave-receiving antenna 4R, so that whether or not the sending and receiving of microwaves are being carried out properly can be monitored. Furthermore, it is also possible to measure the distance between the furnace wall 1R and the furnace wall 1L, and the center position between these, by measuring the time it takes for the microwaves emitted from the microwave sending antenna 3R to be received by the microwave receiving antenna 4L, and the time it takes for the microwaves emitted from the microwave sending antenna 3L to be received by the microwave receiving antenna 4R.

In addition, since part of the emitted microwaves are reflected by the furnace walls and come back, these reflected waves may be received at the same time to measure the distance between the furnace wall 1R and the furnace wall 1L, and the center position between these.

Figure 2:
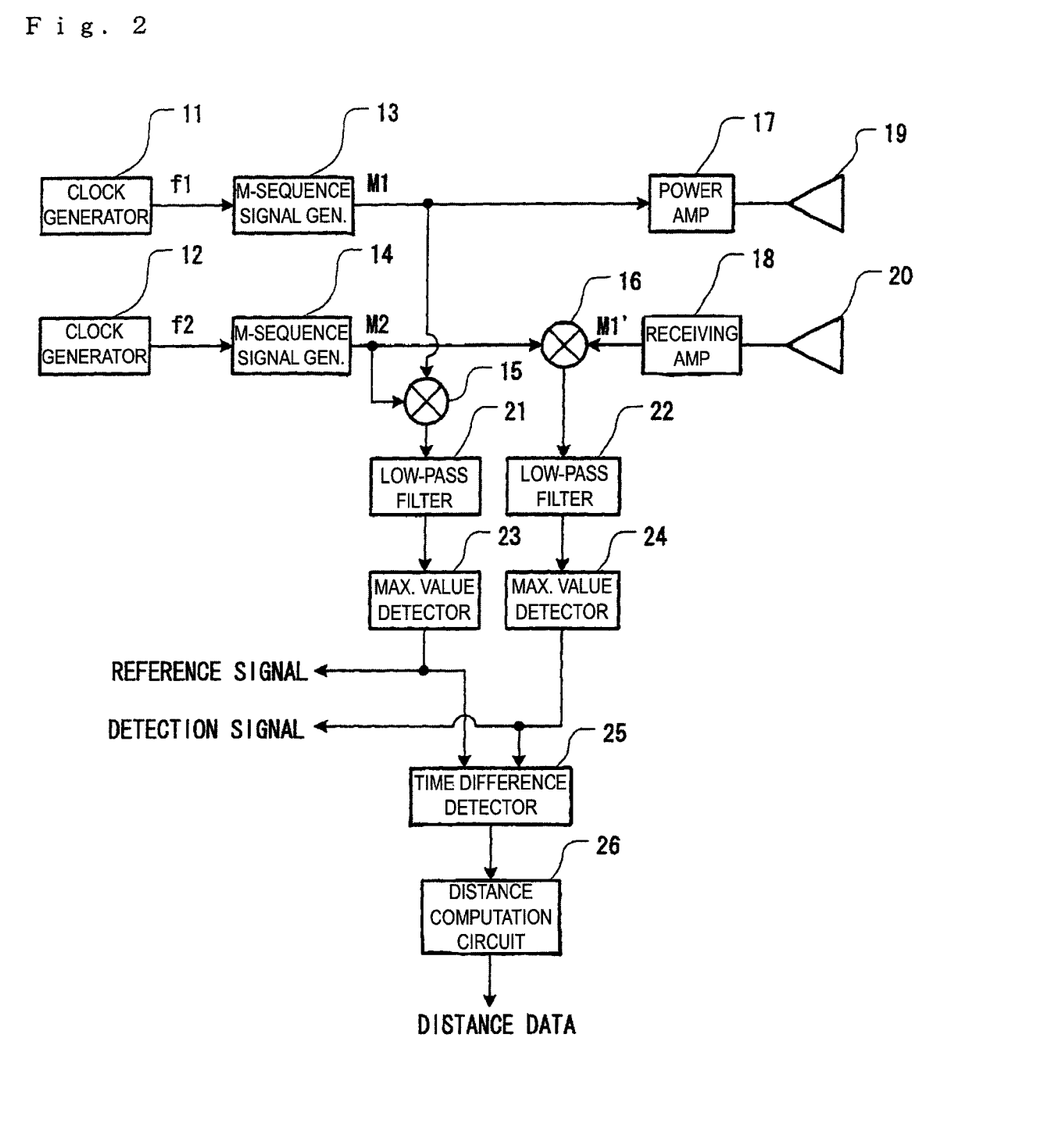
FIG. 2 is a block diagram showing an outline of the circuitry of an edge position measurement apparatus.

The internal circuitry of the right-side edge position measurement apparatus 5R and the left-side edge position measurement apparatus 5L will be briefly described below using FIG. 2. Incidentally, this circuitry is described in detail in Japanese Patent Application Kokoku No. H6-16080 (Patent Reference 2), so that only an outline of this circuitry will be described here.

A clock generator 11 generates a clock signal with a frequency f1. This clock signal enters an M-sequence signal generator 13 and is converted to an M-sequence pseudo-random signal. The term "pseudo-random signal" as used in this Specification and in the Claims refers to a signal that has a periodicity when viewed for a long time but can be considered a random signal when viewed for a short time. An M-sequence signal is universally known as a typical pseudo-random signal composed of two values, "1" and "0," and an example of how such a signal is formed is described in the above-mentioned Patent Reference 2. The wave number of the pulses included in one period of this M-sequence signal is designated as N. The output M1 of the M-sequence signal generator 13 is split in two parts, one of which enters a power amplifier 17, is boosted in power, and is emitted as microwaves from a sending antenna 19.

A clock generator 12 generates a clock signal with a frequency f2. This frequency f2 is set slightly lower than the frequency f1. This clock signal enters an M-sequence signal generator 14 and is converted into an M-sequence pseudo-random signal. Since the M-sequence signal generator 13 and M-sequence signal generator 14 are made up of exactly the same circuitry, the repeat patterns of the output from the M-sequence signal generator 13 and M-sequence signal generator 14 are the same, and the only difference is the frequency.

The output M2 of the M-sequence signal generator 14 is split in two parts, one of which enters a multiplier 15 and is multiplied by the output M1 of the M-sequence signal generator 13. The output of the multiplier 15 enters a low-pass filter 21, where the high-frequency component is removed. The output of this low-pass filter 21 is a triangular wave. The timing with which the output of this low-pass filter 21 reaches its maximum value is detected by a maximum value detection circuit 23, pulses are generated with this timing, and these are used as a reference signal. If the period of this reference signal is designated as $T_A$, the difference in wave number between the signal M1 and the signal M2 included in this period $T_A$ is the wave number N of exactly one period. Specifically, this is expressed as follows:

$$T_A \cdot f1 = T_A \cdot f2 + N$$

From this, the following is obtained:

$$T_A = N/(f1-f2) \qquad (1)$$

The microwaves reflected by the edge of the cold-rolled steel sheet 2 are received by a receiving antenna 20 and amplified by a receiving amplifier 18. The output signal M1' of the receiving amplifier 18 enters a multiplier 16 and is multiplied by the output signal M2 of the M-sequence signal generator 14. The output of the multiplier 14 enters a low-pass filter 22, where the high-frequency component is removed. The output of this low-pass filter 22 is a triangular wave. The timing with which the output of this low-pass filter 22 reaches its maximum value is detected by a maximum value detection circuit 24, pulses are generated at this timing, and these are used as a detection signal.

If the time from when microwaves are emitted by the sending antenna 19 until the reflected waves are detected by the receiving antenna 20 is designated as Δt, and the difference between the time at which a detection signal is generated and the time at which a reference signal is generated is designated as τ, then the wave number of the signal M2 generated during τ is lower than the wave number of the signal M1 generated during τ by the wave number of the signal M1 generated during Δt. Accordingly, the following equation holds true:

$$\tau \cdot f2 = \tau \cdot f1 - \Delta t \cdot f1$$

From this, the following is obtained:

$$\Delta t = (f1-f2) \cdot \tau / f1 \qquad (2)$$

A time difference detection circuit 25 performs this calculation and computes A.

If the velocity of the microwaves is designated as c, the distance x between the two edges of the sending antenna 19 and the receiving antenna 20 is calculated from the following equation, and the positions of the two edges are ascertained from this:

$$x=(f1-f2)\cdot \tau \cdot c/(2\cdot f1) \qquad (3)$$

A distance computation circuit 26 performs this calculation to find the distance x.

With this means, only signals having the same waveform as the M-sequence signals generated by the M-sequence signal generator 13 and M-sequence signal generator 14 are valid. Therefore, noise can be eliminated almost completely, and even in cases where the output of the reflected waves is very small, the reflected wave signal can be taken off at a high S/N ratio.

In cases where the microwaves from the microwave sending antenna 3R in FIG. 1 are detected by the microwave receiving antenna 4L, or in cases where the microwaves from the microwave sending antenna 3L are detected by the microwave receiving antenna 4R, detection error caused by mixing of the two signals can be prevented by having the waveform of the M sequence used in the right-side edge position measurement apparatus 5R be separate from the pattern of the M sequence used in the left-side edge position measurement apparatus 5L.

Conversely, in cases where the distance between the furnace wall 1R and the furnace wall 1L is measured, the circuitry that receives an opposite-side M-sequence signal and that performs the same signal processing as the opposite-side signal processing, —namely, the multiplier 15, multiplier 16, receiving amplifier 18, low-pass filter 21, low-pass filter 22, maximum value detection circuit 23, maximum value detection circuit 24, time difference detection circuit 25, and distance computation circuit 26, —must be provided in at least either the right-side edge position measurement apparatus 5R or the left-side edge position measurement apparatus 5L, separately from the circuitry used for detection of its own edge position of the cold-rolled steel sheet 2.

In some cases, of course, the same circuitry may be used for both the right-side edge position measurement apparatus 5R and the left-side edge position measurement apparatus 5L, and measurement is performed by time division, so that mixing of the two sets of microwaves is prevented. In such cases, when either the right-side edge position measurement apparatus 5R or the left-side edge position measurement apparatus 5L emits microwaves to perform the measurement of the edge position of the cold-rolled steel sheet 2, the other apparatus can monitor the sending of microwaves by the opposite side, or can measure the distance between the furnace wall 1R and the furnace wall 1L.

The above description was of a method believed to allow measurement of the edge position of the cold-rolled steel sheet 2 with the best possible accuracy. However, if such high accuracy is not required, it is possible to employ another method, such as the method discussed as prior art in the above-mentioned Patent Reference 2, in which just an M-sequence signal is used to measure the time from the sending of microwaves until their receipt, or a method in which a frequency modulation continuous wave system known as FM-CW radar is used to measure the time from the sending of microwaves until their receipt.

With such a method in which the edge position of a strip of material is determined by measuring the time from the emission of electromagnetic waves until the receiving of the reflected waves, even in cases where there is fluctuation in the level of the received signal, this fluctuation will not affect measurement accuracy as long as the level is sufficient for signal processing. Conversely, abnormality in the measurement environment (such as soiling of the antenna) can be detected by monitoring the level of the signal. With a conventional method, it was difficult to thus separate an abnormality in the measurement environment from a change in measurement data, and this was a source of measurement error. However, such a problem can be avoided with the present invention.

Furthermore, in the present working configuration, only the antennas were exposed to the environment. Therefore, if some means is employed to keep the antennas from being soiled, maintenance work can be eliminated. If metal powder or other such dust should adhere to an antenna, this dust causes a drop in the output of electromagnetic waves. Accordingly, it is preferable to prevent the adhesion of dust by gas purging the electromagnetic wave emission part of the antenna.

Figure 3:
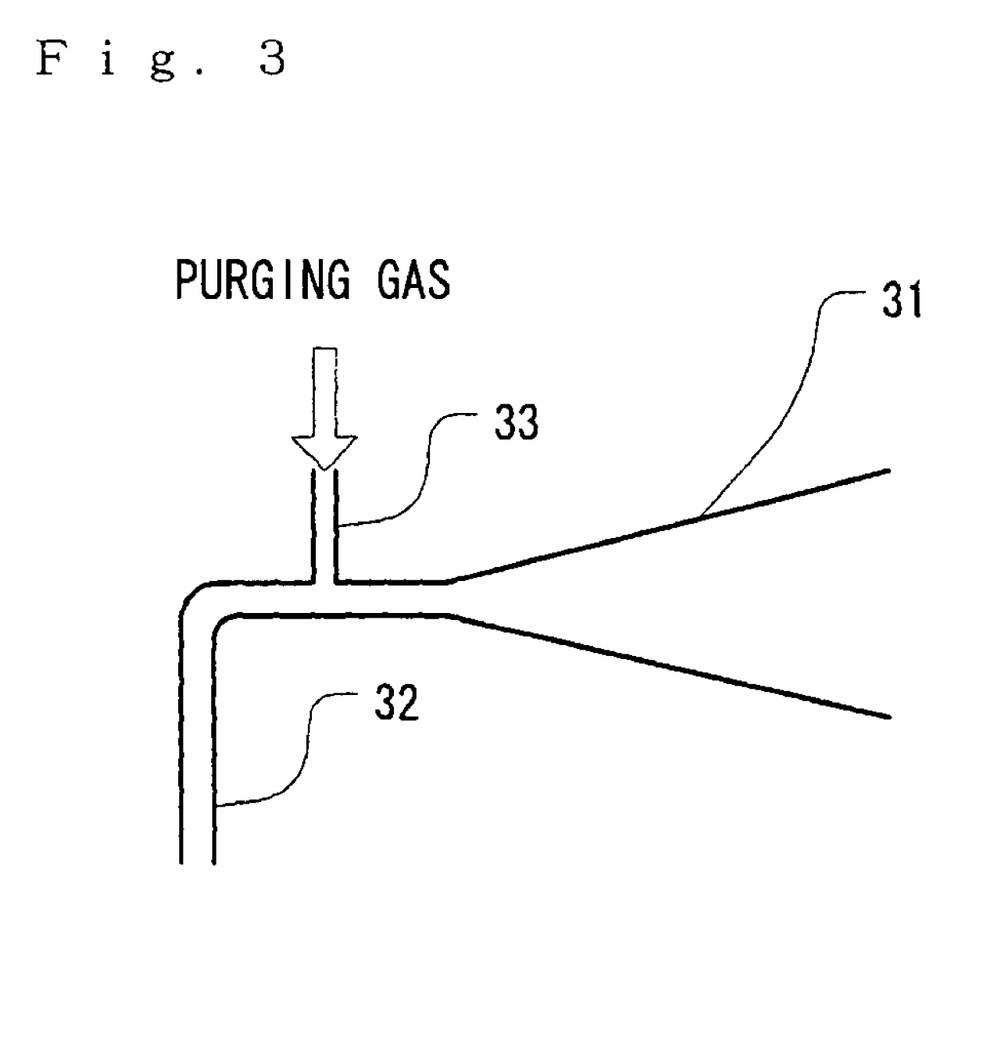
FIG. 3 is a diagram showing an example of a gas purging mechanism for an antenna.

An example of this is shown in FIG. 3. A purging pipe 33 is connected to part of a waveguide tube 32 linked to a microwave antenna 31, and a purging gas is blown in through this pipe. This purging gas goes through the waveguide tube 32 and flows to the side of the microwave antenna 33, thereby purging the inside of the microwave antenna so that dust will not adhere. Air, nitrogen, or the like can be used as the purging gas, but in cases where the installation is in a place suffused with an atmosphere gas such as in a continuous annealing furnace, the purging is preferably accomplished with the atmosphere gas.

The invention claimed is:

1. A method for measuring the width-direction center position of a moving strip of material, wherein a first width-direction end of the material strip is irradiated with electromagnetic waves from a first antenna, the electromagnetic waves reflected by the first width-direction end are received by the first antenna, the position of the first width-direction end of the material strip is determined on the basis of the time difference between the point when the electromagnetic waves were emitted and the point when the reflected electromagnetic waves were detected, a second width-direction end of the material strip is irradiated with electromagnetic waves from a second antenna, the electromagnetic waves reflected by the second width-direction end are received by the second antenna, the position of the second width-direction end of the material strip is determined on the basis of the time difference between the point when the electromagnetic waves were emitted and the point when the reflected electromagnetic waves were detected, and the width-direction center position of the material strip is measured from the position of the first width-direction end and the position of the second width-direction end.

2. The method for measuring the width-direction center position of a strip of material according to claim 1, wherein:
the first antenna and second antenna are disposed across from each other, and
the electromagnetic waves emitted from at least one antenna are received by the other antenna.

3. The method for measuring the width-direction center position of a strip of material according to claim 2, wherein a distance between the opposing antennas is also determined from the propagation time of the electromagnetic waves emitted by an antenna and received by the opposite antenna.

4. The method for measuring the width-direction center position of a strip of material according to claim 1, wherein antennas that each have a function of gas purging an electromagnetic wave emission face are used as the first antenna and second antenna.

5. An apparatus for measuring the width-direction center position of a moving strip of material, comprising:
- a first antenna that emits electromagnetic waves toward a first width-direction end of the material strip and receives the electromagnetic waves reflected by the first width-direction end;
- means for measuring the time difference between the point when the electromagnetic waves were emitted and the point when the reflected electromagnetic waves were detected;
- means for determining the position of the first width-direction end of the material strip on the basis of the measured time difference;
- a second antenna that emits electromagnetic waves toward a second width-direction end of the material strip and receives the electromagnetic waves reflected by the second width-direction end;
- means for measuring the time difference between the point when the electromagnetic waves were emitted and the point when the reflected electromagnetic waves were detected;
- means for determining the position of the second width-direction end of the material strip on the basis of the measured time difference; and
- means for detecting the width-direction center position of the material strip from the position of the first width-direction end and the position of the second width-direction end.

6. The apparatus for measuring the width-direction center position of a strip of material according to claim 5, wherein:
- the first antenna and second antenna are disposed across from each other, and
- the electromagnetic waves emitted from at least one antenna are received by the other antenna.

7. The apparatus for measuring the width-direction center position of a strip of material according to claim 6, comprising:
- means for determining the propagation time of the electromagnetic waves emitted by an antenna and received by the opposite antenna; and
- means for determining the distance between the opposing antennas from the propagation time thus determined.

8. The apparatus for measuring the width-direction center position of a strip of material according to claim 7, wherein the first antenna and second antenna each have a function of gas purging an electromagnetic wave emission face.

9. The apparatus for measuring the width-direction center position of a strip of material according to claim 6, wherein the first antenna and second antenna each have a function of gas purging an electromagnetic wave emission face.

10. The apparatus for measuring the width-direction center position of a strip of material according to claim 5, wherein the first antenna and second antenna each have a function of gas purging an electromagnetic wave emission face.

* * * * *